(12) United States Patent
Lang

(10) Patent No.: US 7,506,269 B2
(45) Date of Patent: Mar. 17, 2009

(54) BEZEL INTERFACE FOR SMALL COMPUTING DEVICES

(75) Inventor: Eric G. Lang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 437 days.

(21) Appl. No.: 11/357,761

(22) Filed: Feb. 16, 2006

(65) Prior Publication Data
US 2006/0139320 A1      Jun. 29, 2006

Related U.S. Application Data

(63) Continuation of application No. 09/775,077, filed on Jan. 31, 2001, now abandoned.

(51) Int. Cl.
*G06F 3/048* (2006.01)
(52) U.S. Cl. ........................ 715/786; 715/829; 715/830; 715/854; 715/864

(58) Field of Classification Search .................. 715/701, 715/787, 834, 784, 786, 829, 830, 854, 856, 715/864
See application file for complete search history.

(56) References Cited

U.S. PATENT DOCUMENTS

| | | | | |
|---|---|---|---|---|
| 5,664,132 A | * | 9/1997 | Smith | 715/786 |
| 6,219,032 B1 | * | 4/2001 | Rosenberg et al. | 715/862 |
| 6,556,222 B1 | * | 4/2003 | Narayanaswami | 715/786 |

* cited by examiner

*Primary Examiner*—Weilun Lo
*Assistant Examiner*—Truc T Chuong
(74) *Attorney, Agent, or Firm*—Merchant & Gould PC

(57) ABSTRACT

A user interface for small computing devices. The user interface includes a display screen and a bezel encircling the display screen. The bezel is adapted to move relative to the display screen in one or more axes. For example, the bezel may be rotated about the display screen, pivoted about a pivot point, or moved in a planar direction. A cursor displayed within the display screen is responsive to movement of the bezel.

18 Claims, 5 Drawing Sheets

BEZEL INTERFACE FOR SMALL COMPUTING DEVICES

RELATED APPLICATION

This application is a continuation of prior, co-pending U.S. patent application for "BEZEL INTERFACE FOR SMALL COMPUTING DEVICES," filed on Jan. 31, 2001 and assigned Ser. No. 09/775,077, the complete disclosure of which is hereby incorporated by reference in its entirety.

TECHNICAL FIELD

The present invention relates to an interface for electronic devices, and more specifically to a bezel interface for small computing devices.

BACKGROUND OF THE INVENTION

As technology advancements continue to miniaturize electronic circuits, portable electronic devices are quickly becoming capable of more and more computationally powerful operations. Many complex program applications, once only executed on large desktop computers, can now be found running on modern "wearable" computer devices. For instance, modern personal digital assistants (PDAs), cellular phones, and smart watches may include a text and e-mail editor, a database program, and an Internet browser.

One complicating factor in executing complex programs on such small computer devices is the lack of physical space available for a practical user interface compatible with complex program applications. Wearable computers often have a small amount of surface area on which to provide a display screen and user input hardware. Because of this spatial constraint, small electronic devices tend to miniaturize input hardware, such as push buttons, knobs, and joysticks, so that less surface area is taken up by input elements. Miniaturizing input hardware, however, often reduces their handiness and makes portable computing devices awkward and difficult to use.

SUMMARY OF THE INVENTION

In accordance with the present invention, the above and other problems are solved by providing a user with a relatively large bezel surface for interfacing with a small computing device. The bezel interface is generally easier to handle and manipulate than conventional interfaces for small computing devices. In addition, the bezel is advantageously positioned along the perimeter of the device such that a majority of the device face is left available for displaying information in a display screen.

Thus, the present invention generally involves a user interface for a small computing device. The user interface includes a display screen for displaying user data. A bezel encircles the display screen and is movable relative to the display screen. Additionally, a cursor displayed within the display screen is responsive to bezel movement.

Another aspect of the present invention is a method of interfacing user input to a small computing device. When implemented as a method, the present invention includes the acts of displaying a cursor on a display screen; receiving a movement signal indicating movement of a bezel relative to the display screen, wherein the bezel encircles the display screen; and positioning the cursor on the display screen in response to the received movement signal.

The invention may also be implemented as a portable Internet device. Such a device includes a display screen for displaying Internet data. A bezel encircling the display screen is movable relative to the display screen. The device also includes at least one movement sensor configured to provide a movement signal when movement of the bezel occurs.

These and various other features as well as advantages, which characterize the present invention, will be apparent from a reading of the following detailed description and a review of the associated drawings.

DETAILED DESCRIPTION OF THE INVENTION

Figure 1:
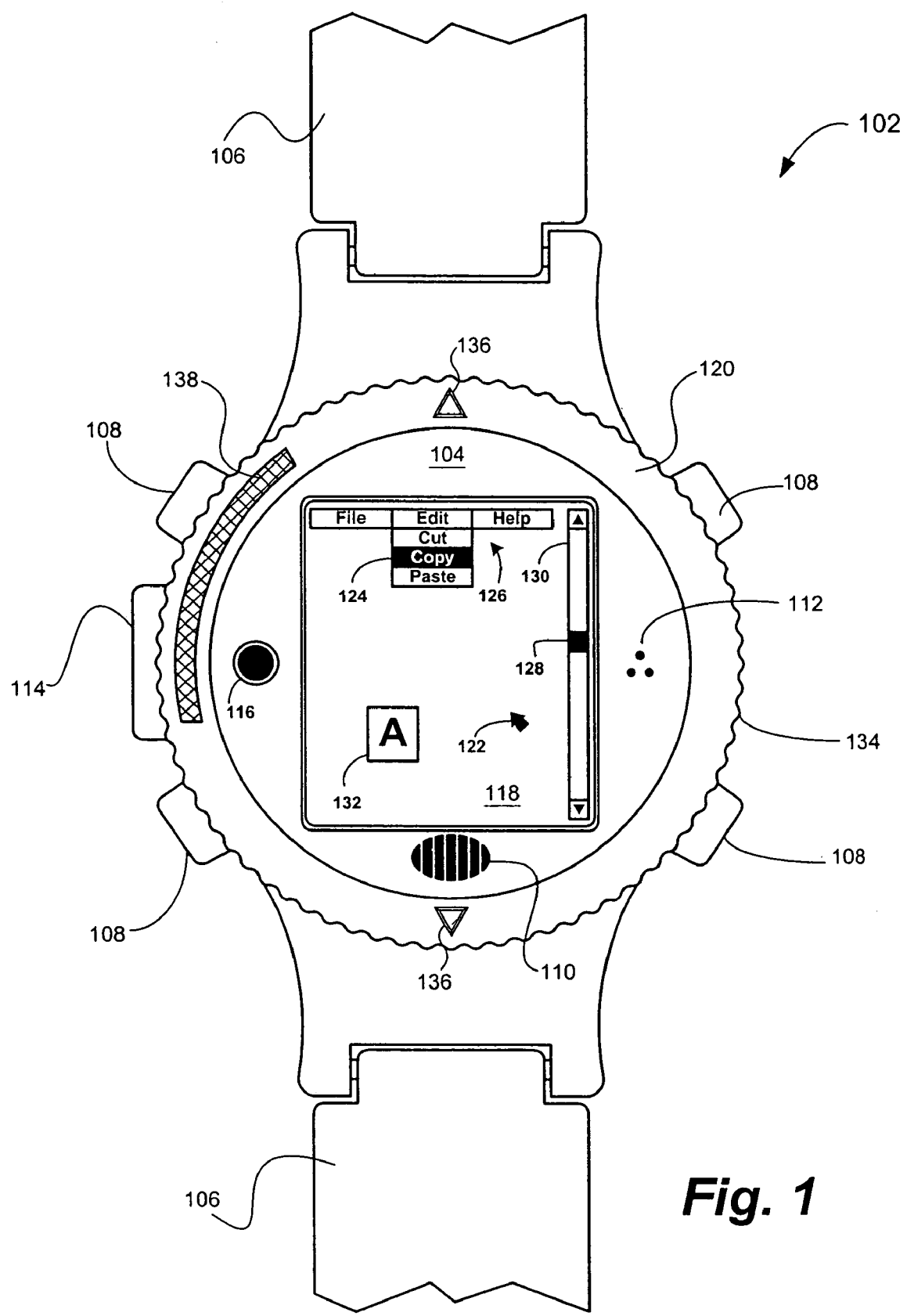
FIG. 1 shows an exemplary smart watch device embodying the present invention.

It is contemplated that the user interface of the present invention is employed to control small computing devices executing complex program applications therein, as well as to manipulate and enter data in the applications. Such small computing devices include personal digital assistants (PDAs), smart watches, mobile telephones, and the like. The present invention and its various embodiments are described in detail below with reference to the figures. When referring to the figures, like structures and elements shown throughout are indicated with like reference numerals.

In FIG. 1, an exemplary smart watch 102 embodying the present invention is shown. The smart watch 102 includes a device housing 104 containing the various components of the device. The device housing 104 is preferably made from a durable material, such as a metallic alloy or a hard plastic, which is capable of withstanding the rougher treatment associated with portable devices. A strap 106 is coupled with the housing 104 to hold the smart watch 102 close to the user. The strap 106 may be made from metal, plastic, leather, or other suitable material.

The smart watch 102 includes one or more input buttons 108 mounted on the device housing 104. The input buttons 108 provide activation signals to the smart watch 102 which are responsive to user interaction. For example, an input button 108 may be used to turn on and off a device backlight (not shown), change modes of operation, or start and stop a timer. Thus, the input buttons 108 enable a user to control the smart watch 102 by selecting different tasks during different operating stages of the device. Various types of input elements may be employed by the present invention, including, but not limited to, pull/push button switches, rocker switches, and touch sensitive elements.

The smart watch 102 may also include a speaker 110 and a microphone 112. The speaker 110 can be used to play recorded music, provide auditory alarms, and produce other sound output. The microphone 112 can be used to detect sound for recording, pick-up voice commands, and carry out telephone communications.

Additional hardware may be coupled to the smart watch 102 through a connector 114. Such peripheral hardware may include digital cameras, mass storage devices, network adapters, printers, and scanners. Data transfer between the smart watch 102 and peripheral hardware may be conducted through serial or parallel data transfer protocols. In addition, a communication port 116 may be used to carry out wireless communications with other electrical devices. Various communication protocols may be supported by the communication port 116, including Hyper Text Transfer Protocol (HTTP), Post Office Protocol (POP), Time Division Multiple Access (TDMA), Code Division Multiple Access (CDMA), and Wireless Application Protocol (WAP). It should be noted that the protocols listed above are provided as examples only; it is contemplated that many other protocols known by those skilled in the art may be supported by the smart watch 102. In one embodiment of the present invention, the smart watch 102 is part of a wireless piconet, such as a BLUETOOTH™ WAP. BLUETOOTH is a Trademark owned by Telefonaktiebolaget LM Ericsson.

A display screen 118 on the smart watch 102 is used to display information to the user. The display screen 118 is preferably a low power, high-resolution display, such as a liquid crystal display (LCD), and may be a monochrome, gray scale, or color display. Furthermore, the display screen 118 may be touch-sensitive, thereby providing activation signals to the smart watch 102 when the display screen 118 is contacted by the user. A stylus (not shown) or other pointing device can be used in conjunction with a touch-sensitive display screen 118 to activate a small region of the display.

In accordance with an embodiment of the present invention, a bezel 120 encircling the display screen 118 provides a user interface for the smart watch 102. As described in detail below, the bezel 120 is movable relative to the display screen 118 in one or more axes. For example, the bezel 120 can be rotated clockwise and counterclockwise, pivoted about a central pivot point, and slid horizontally and vertically with respect to FIG. 1. Bezel movement, in turn, is converted to user input for controlling the smart watch 102 and entering data. Particularly, the bezel 120 can be used to direct a cursor within the display screen 118.

In FIG. 1, the display screen 118 is shown containing several exemplary cursors contemplated by the present invention. One such cursor is a pointing icon cursor 122 which moves around the display screen 118 in response to bezel motion. For example, the pointing icon cursor 122 may move left across the display screen 118 in response to the bezel 120 being nudged left, pivoted left, or turned counterclockwise with respect to FIG. 1. The rotation speed of the bezel 120 can be measured to provide variable cursor acceleration. In addition, the pointing icon cursor 122 can be activated to select text, check boxes, and menu items, and other screen objects. Activation of the pointing icon cursor 122 may be achieved by actuating the bezel 120 or an input button 108. Furthermore, the pointing icon cursor 122 may support drag-and-drop operations when cursor activation is sustained while the bezel 120 is moved. It is contemplated that the pointing icon 122 may change in appearance to indicate an action to be performed if the cursor 122 is activated.

The bezel 120 may also be used to control a highlighted selection cursor 124 within a selection array 126. The highlighted selection cursor 124 is able to move left, right, up, and down within the menu array 126 according to bezel movement. For example, when the bezel 120 is rotated clockwise, the highlighted selection cursor 124 moves right, and when the bezel 120 is rotated counterclockwise the cursor 124 moves left. Similarly, a pivoting and/or sliding motion of the bezel 120 may control the position of the highlighted selection cursor 124. The highlighted selection cursor 124 can operate to select or enter application menus, text, checkboxes, radio buttons, and other interface widgets.

Another cursor contemplated by an embodiment of the present invention is a scroll bar cursor 128. As the scroll bar cursor 128 moves along a scroll bar 130, the display screen 118 is scrolled in the direction of the cursor movement. Scroll bar cursor movement is controlled by the bezel 120. For example, the scroll bar cursor 128 may be moved up and down along a scroll bar 130 by rotating the bezel 120 clockwise and counterclockwise, respectively. Similar cursor movement may be achieved by pivoting or nudging the bezel 120 up and down with respect to FIG. 1.

The bezel 120 may also be used in conjunction with a text selection cursor 132 for entering alphanumeric text in the smart watch 102. For example, the bezel 120 may be rotated clockwise and counterclockwise to scroll through a set of characters displayed in the text selection cursor 132. When the desired character appears in the text selection cursor 132, the user activates the cursor 132 and the desired character is entered. Activation of the text selection cursor 132 may be achieved by actuating the bezel 120 or an input button 108. In another embodiment of the present invention, the text selection cursor 132 and bezel 120 may operate in accordance with U.S. Pat. No. 6,972,748, entitled "J-Key Input for Computer Systems" and hereby incorporated by reference in its entirety.

It is contemplated that combinations of bezel movements, or gestures, may be used to interact with the smart watch 102. For example, pivoting the bezel 120 left and then rotating the bezel 120 may cause the screen 118 to scroll vertically, while pivoting the bezel 120 right and then rotating the bezel 120 may cause the screen 118 to scroll horizontally. In a similar, manner bezel gestures may be used to enter alphanumeric input.

The present invention provides the user with a relatively large bezel surface for interfacing with a small computing device. Therefore, the bezel interface is generally easier to handle and manipulate than conventional interfaces for small computing devices. In addition, the bezel is advantageously positioned along the perimeter of the device such that a majority of the device face is left available for displaying information in a display screen. Thus, the bezel interface of the present invention supplies a relatively large user input surface while sacrificing only a minimum amount of display screen room.

In one embodiment of the present invention, the bezel 120 includes ridges 134 to help the user grip the bezel 120. Other types of surface treatments, such as protrusions and depressions on the bezel surface, are also contemplated. The bezel 120 may also include a rubber surface to further prevent finger slippage. Other high friction materials placed on the bezel 120 are considered within the scope and spirit of the present invention.

Yet another embodiment of the present invention may include bezel buttons 136 on the bezel surface. The bezel buttons 136 can be dynamically assignable to various tasks according the current application executed by the smart watch 102. Alternatively, the bezel buttons 136 may be assigned to specific tasks which stay constant regardless of the executed application. In one embodiment of the invention, the bezel 120 includes at least one touch sensor 138 responsive to finger contact. As such, the user may slide a finger along the sensor 138 to "virtually" rotate the bezel 120 in the direction of the finger movement without actually moving the bezel 120. Similarly, the smart watch 102 may be configured to interpret a brief finger tap on the touch sensor 138 as a virtual pivot or nudge of the bezel 120.

Figure 2:
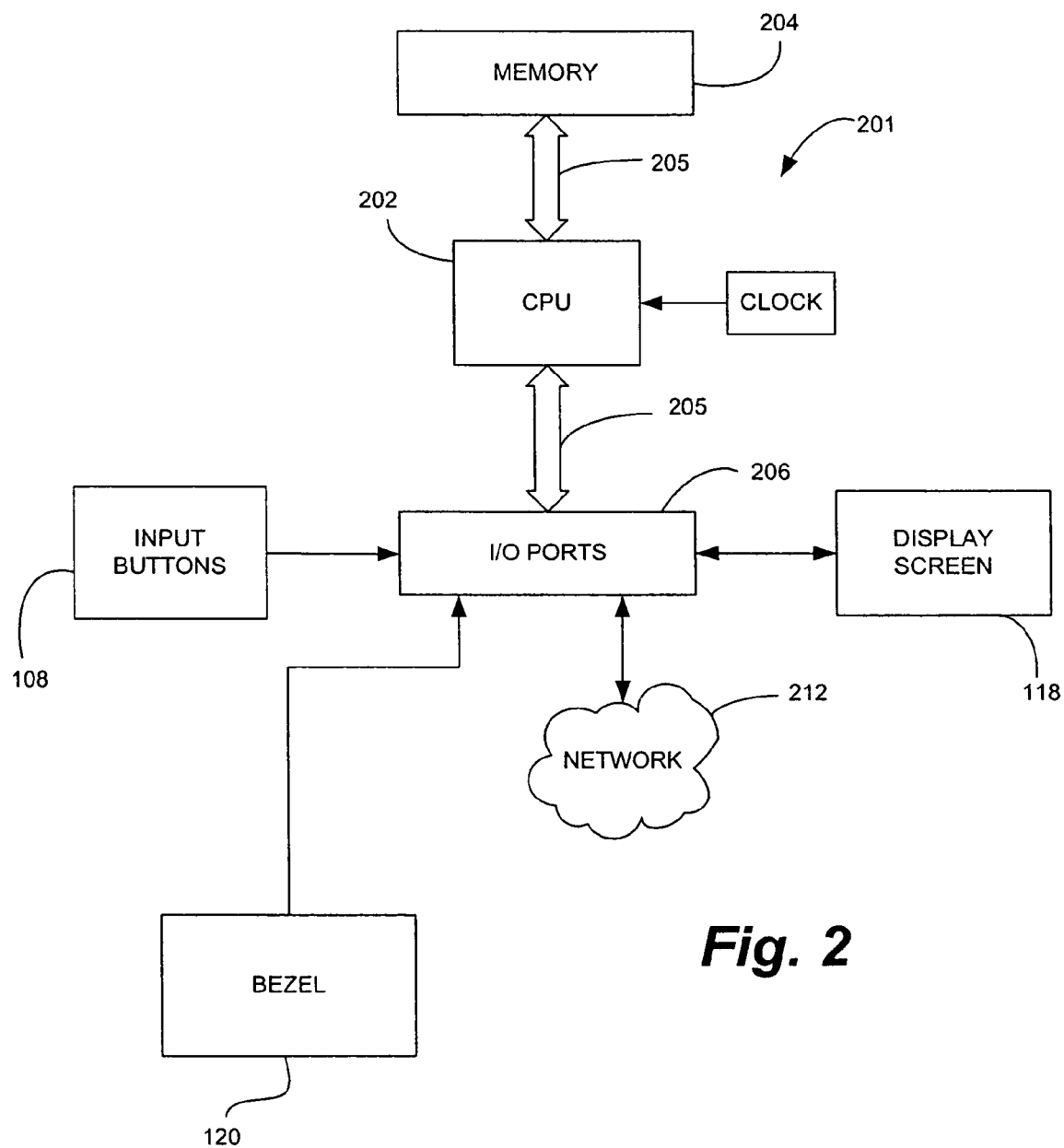
FIG. 2 shows the major electrical components of a small computing device employing the present invention.

In FIG. 2, the major electrical components of a computing device 201 employing the present invention are shown. The small computing device 201 includes a central processing unit (CPU) 202 which is primarily responsible for carrying out arithmetic, logic, and control operations. The CPU 202 may include a floating-point unit (FPU) and/or a co-processor (not shown). Additionally, the CPU 202 may be a general-purpose processor, a digital signal processor (DSP), or other state machine circuit.

A memory unit 204 for storage of data and program code is coupled with the CPU 202 through a system bus 205. The memory unit 204 may include a memory cache, random access memory (RAM), video RAM (VRAM), and read only memory (ROM). In addition, the memory unit 204 may encompass mass storage media, such as magnetic and optical memory media.

The CPU 202 also communicates with input/output (I/O) ports 206 through the system bus 205. The I/O ports 206 allow the CPU 202 to receive and transmit data from and to the outside environment. Thus, various input and output components of the computing device 201, such as the display screen 118, the input buttons 108, and the bezel interface 120 are coupled to the I/O ports 206 for transmitting and receiving data to and from the user, respectively. The CPU 202 may access the I/O ports 206 as either memory mapped I/O space or as separately mapped I/O space. In addition, the I/O ports 206 may be configured to support interrupt-driven CPU access.

According to one embodiment of the present invention, the I/O ports 206 are also coupled to a network 212, such as the Internet. Preferably, communications over the network 212 is achieved over a wireless connection between the computing device 201 and a network server (not shown). For example, the computing device 210 may use a transfer control protocol/Internet protocol (TCP/IP) to exchange data across the network 212.

Figure 3:
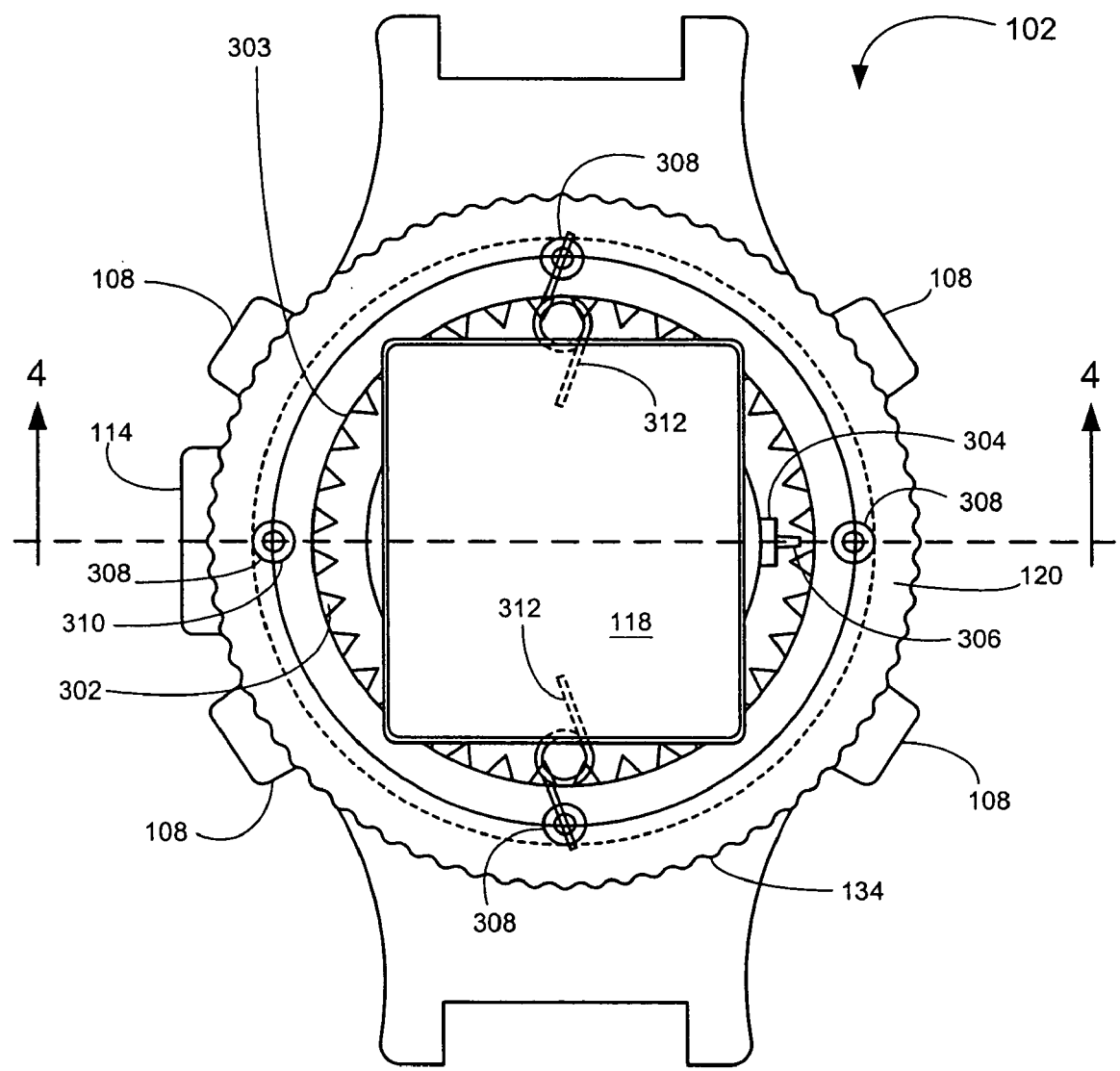
FIG. 3 shows one embodiment of the bezel interface assembly as contemplated by the present invention.

In FIG. 3, one embodiment of the bezel interface assembly as contemplated by the present invention is shown. The bezel 120 is substantially ring-shaped with an outer surface 134 and an inner surface 303. As discussed above, rotation of the bezel 120 about the display 118 may be used to control the smart watch 102. Thus, when the bezel 120 is turned clockwise or counterclockwise, a rotation sensor 304 is configured to sense the magnitude and direction of the bezel rotation. The rotating sensor then sends a motion signal corresponding to the bezel motion to the CPU 202 (see FIG. 2), which acts upon the bezel motion.

In one embodiment of the invention, the rotation sensor 304 is a spring-loaded, single throw, double pole switch. The rotation sensor 304 is activated when inwardly pointed bezel teeth 302 along the inner surface 303 of the bezel 120 are rotated past the sensor 304. Thus, when the bezel 120 is rotated counterclockwise, the bezel teeth 302 push the sensor throw 306 upwardly to make contact with a first switch pole, and thereby indicating counterclockwise rotation of the bezel 120. Conversely, when the bezel 120 is rotated clockwise, the bezel teeth 302 push the switch throw 306 downwardly to make contact with a second switch pole, thereby indicating a clockwise rotation of the bezel 120. Since the switch throw 306 is spring-loaded, it returns to an off position each time a bezel tooth passes. The magnitude of the bezel rotation is determined by the number of times the rotation sensor 304 is switched on by the bezel teeth 302. In a further embodiment of the present invention, the bezel 120 may be biased by one or more springs 312 to return the bezel 120 to a non-rotated or rest position when no external rotational force is applied.

It is contemplated that other means of sensing bezel rotation movement may be utilized in the present invention. For example, those skilled in the art will recognize that bezel rotation may be sensed using an optical encoder assembly. Specifically, an alternating pattern of reflective and non-reflective colors may be added to the inner surface 303 of the bezel 120. Optical transmitters and receivers are used to determine rotation direction and magnitude of the bezel 120 as the color pattern is rotated. Alternatively, an encoder ring having a plurality of slits may be used to pass and block light from an optical transmitter to an optical receiver. It is further contemplated that a magnetic strip with an alternating pattern of north and south poles may be attached to the inner surface 303 of the bezel 120, and a pair of magnetic sensors are used to sense bezel rotation. These and other configurations for sensing bezel rotation movement, such as potentiometers, are considered within the scope and spirit of the claimed invention.

In another embodiment of the present invention, pivot sensors 308 mounted below the bezel 120 are used to sense bezel pivot movement. For example, a left push button 310 is activated when the bezel 120 is pivoted in a leftwardly direction about a center point. The bezel 120 may also be biased by a spring to return to a non-pivoted position when no external pivoting force is applied. Bezel pivot motion detection is discussed in greater detail below.

Figure 4:
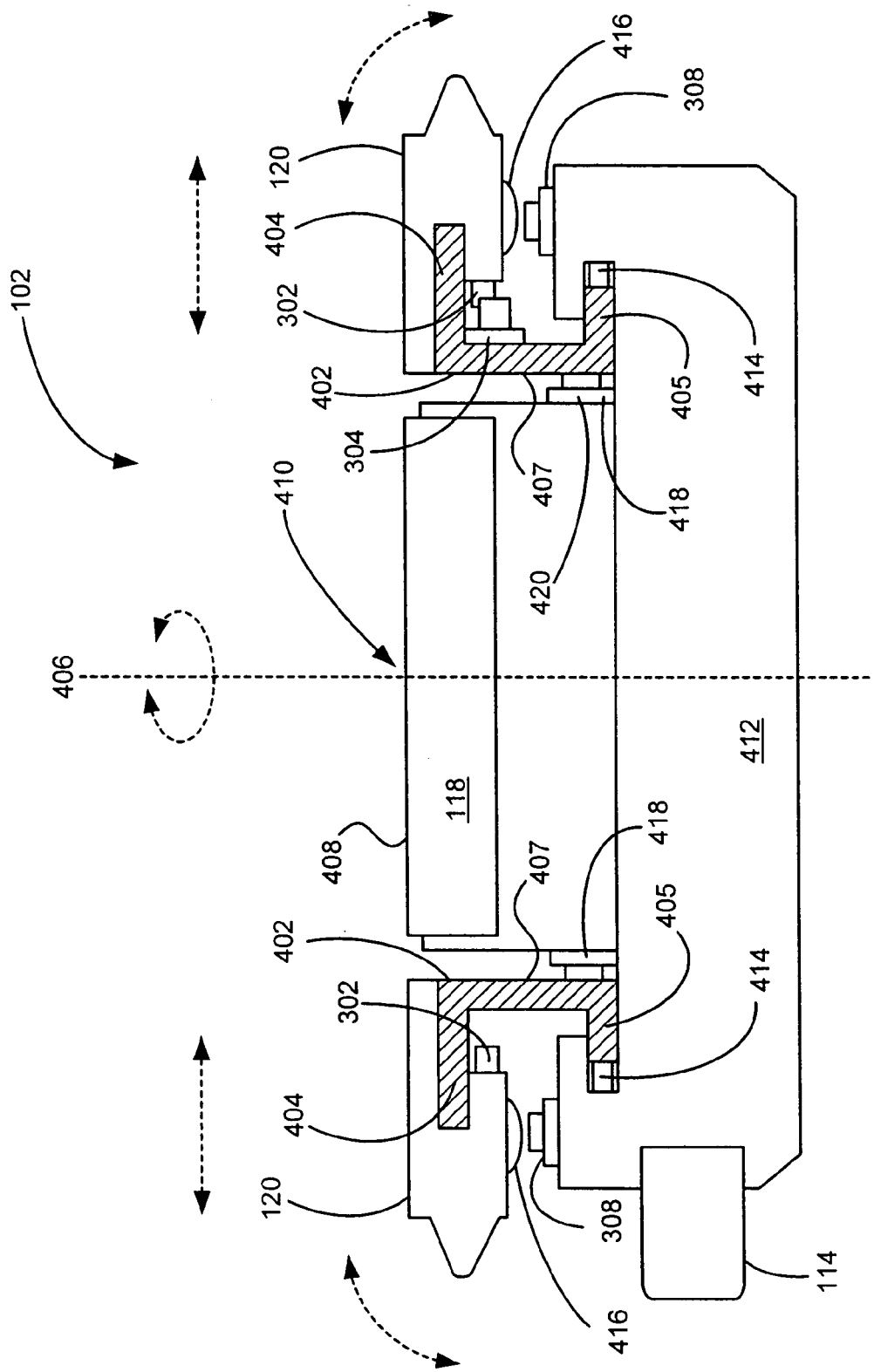
FIG. 4 shows a cross-sectional view of the smart watch of FIG. 3 along section line 4-4.

Referring to FIG. 4, a cross-sectional view of the smart watch 102 of FIG. 3 along section line 4-4 is shown. The bezel 120 is rotatably coupled to a bezel platform 402, such that the bezel platform 402 stays fixed in position when the bezel 120 is rotated about the bezel platform 402. The bezel platform 402 has a substantially C-shaped profile and includes a sidewall 407 coupled with an upper lip 404 and a lower lip 405.

As mentioned earlier, the bezel 120 may be pivoted about a center axis 406, wherein the center axis 406 is normal to a display surface 408 and passes through a center point 410 on the display 118. In this manner, the bezel 120 is pivotable about a pivot point on the center axis 406 by applying downwardly directed force on the bezel 120. When such pivot force is applied, a contact pad 416 is pressed into a pivot sensor 308 and the pivot sensor is activated. In one embodiment of the present invention, the upper lip 404 and sidewall 407 form a spring, thereby biasing the bezel 120 to a non-pivoted or rest position when no external pivoting force is applied to the bezel. Therefore, when the pivot force is removed, the platform spring returns the bezel 120 to the center position and the pivot sensor 308 becomes deactivated.

In yet another embodiment of the present invention, the bezel platform 402 is slideably coupled with a watch base 412 at the lower lip 405. Side springs 414 bias the bezel 120 and bezel platform 402 to a center position when the bezel 120 is released or at rest. In this configuration, movement sensors 418 are arranged to detect linear or planar motion of the bezel 120 and bezel platform 402. For example, when the bezel 120 is nudged to the right with respect to FIG. 4, a micro push button switch 420 is pressed against the bezel platform 402, thereby providing a movement signal to the smart watch 102. When the linear external force is removed, the side springs 414 return the bezel 120 to the center position, thus, deactivating the movement sensors 418.

Figure 5:
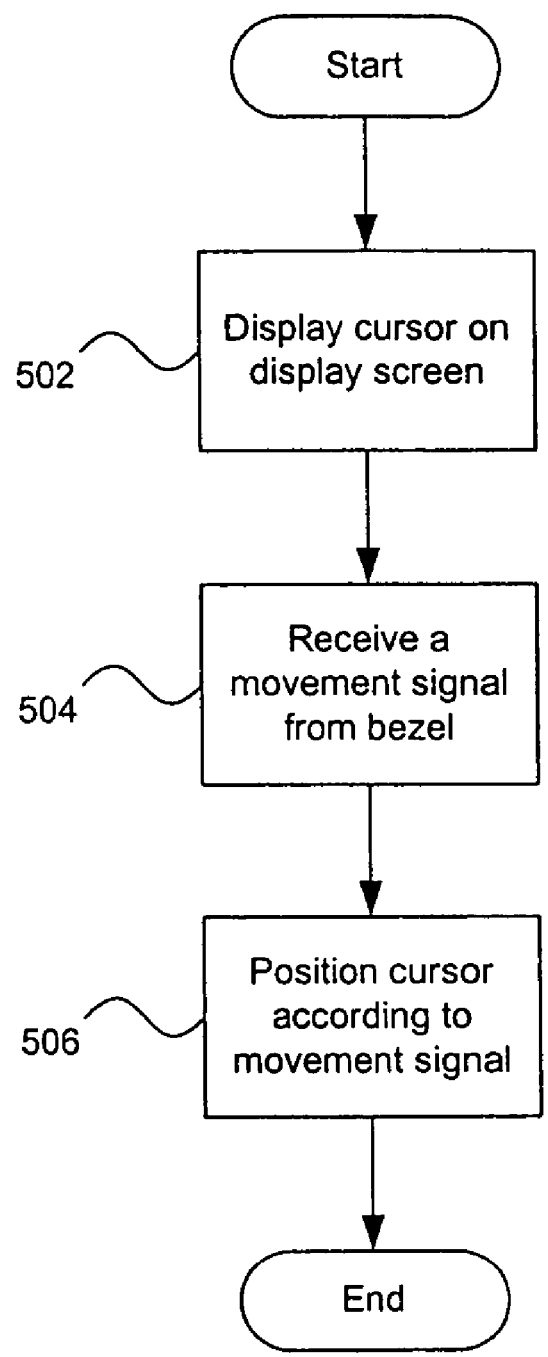
FIG. 5 shows an operational flow diagram of the bezel interface as contemplated by the present invention.

In FIG. 5, an operational flow diagram of the bezel interface as contemplated by the present invention is shown. Display operation 502 displays a cursor on the display screen 118. As mentioned earlier, the cursor may include a pointing icon cursor, a highlighted menu selection cursor, a scroll bar cursor, and a text selection cursor. Furthermore, the position of the cursor is responsive to movement of the bezel 120.

During a receive operation 504, a movement signal is received from a bezel sensor. As discussed previously, the present invention may include one or more bezel sensors configured to indicate movement of the bezel 120 relative to the display screen 118. For example, a rotation sensor provides a movement signal when the bezel 120 is rotated about a center axis normal to the display surface and passing through a center point on the display surface. Furthermore, pivot sensors provide movement signals indicating pivot motion of the bezel 120 about a pivot point located on the center axis. Movement sensors may also be present to provide movement signals when the bezel 120 is moved along a plane substantially parallel to the display surface. Movement sensors may also work together to sense a combination of movements such as rotation and pivoting, sliding and pivoting, or all three motions together.

A positioning operation 506 positions the cursor on the display screen 118 to a new location in response to received movement signals. The movement signals are passed through I/O ports 206 (see FIG. 2) to the CPU 202, wherein the CPU 202 processes the movement signals received. After the CPU 202 determines the type of movement undergone by the bezel 120, the CPU 202 redraws the cursor in the display screen 118 according to the movement of the bezel 120.

Although the invention has been described and illustrated with a certain degree of particularity, it is understood that the present disclosure has been made only by way of example, and that numerous changes, combinations, and arrangements of techniques can be resorted to by those skilled in the art without departing from the spirit and scope of the invention as claimed below.

The invention claimed is:

1. A user interface suitable for a small computing device, the user interface comprising:
   a display screen operable to display computer-generated information;
   a bezel encircling the display screen, wherein the bezel is rotatable about a substantially central point on the display screen and wherein the bezel is pivotable about an axis extending substantially through the substantially central point on the display screen;
   at least one first movement sensor configured to provide a first movement signal when movement of the bezel occurs, wherein the first movement signal is operable to scroll computer-generated information presented on the display screen in a vertical direction in response to the bezel being pivoted in a first direction and subsequently rotated and operable to scroll computer-generated information presented on the display screen in a horizontal direction in response to the bezel being pivoted in a second direction and subsequently rotated;
   at least one second movement sensor configured to provide a second movement signal when movement of the bezel occurs in a planar direction substantially parallel to the display screen, wherein the second movement signal is operable to move a cursor displayed on the display screen in the planar direction; and
   a browser application presented on the display screen and operable to render web pages for viewing by a user of the small computing device, wherein movement of the bezel provides the user functionality to scroll through information presented in the web pages;
   wherein the small computing device is a wristwatch.

2. A user interface as defined in claim 1, wherein the second direction is substantially opposite the first direction.

3. A user interface as defined in claim 1, further comprising:
   a browser application presented on the display screen and operable to render electronic pages for viewing by a user of the small computing device, wherein movement of the bezel provides the user functionality to scroll through information presented in the web pages.

4. A user interface as defined in claim 1 wherein the cursor is also responsive to said first movement signal.

5. A user interface as defined in claim 1, wherein the bezel is biased to a non-rotated position.

6. A user interface as defined in claim 5, further comprising:
   a spring coupled with the bezel to bias the bezel to the non-rotated position.

7. A user interface as defined in claim 1, wherein the bezel includes at least one touch sensor responsive to finger contact.

8. A user interface as defined in claim 1, wherein the bezel is biased to a non-pivoted position.

9. A user interface as defined in claim 8, further comprising:
   a spring coupled with the bezel to bias the bezel to the non-pivoted position.

10. A user interface as defined in claim 1, wherein the at least one first movement sensor comprises a magnetic switch.

11. A computer-implemented method of interfacing user input to a small computing device, the method comprising:
    displaying computer-generated information on a display screen;
    receiving a first movement signal indicating movement of a bezel relative to the display screen, wherein the bezel encircles the display screen and wherein the bezel is rotatable about a substantially central point on the display screen and wherein the bezel is pivotable about an axis extending substantially through the substantially central point;
    scrolling the computer-generated information in a vertical direction if the bezel movement involves a pivot action toward a first direction and subsequent rotation;
    scrolling the computer-generated information in a horizontal direction if the bezel movement involves a pivot action toward a second direction and subsequent rotation;
    receiving a second movement signal indicating movement of the bezel in a planar direction substantially parallel to the display screen;
    moving a cursor displayed on the display screen in the planar direction; and
    a browser application presented on the display screen and operable to render web pages for viewing by a user of the small computing device, wherein movement of the bezel provides the user functionality to scroll through information presented in the web pages; and further
    wherein the small computing device is a wristwatch.

12. A method as defined in claim 11, wherein the second direction is substantially opposite the first direction.

13. A method as defined in claim 12, wherein the first direction is left and the second direction is right.

14. A method as defined in claim 11, further comprising:
    biasing said bezel to a non-rotated position.

15. A method as defined in claim 11, further comprising:
    biasing said bezel to a non-pivoted position.

16. A user interface suitable for a small computing device, the user interface comprising:
    a display screen operable to display computer-generated information;
    a bezel encircling the display screen, wherein the bezel is operable to rotate about a substantially central point on the display screen and wherein the bezel is operable to pivot about an axis extending substantially through the substantially central point on the display screen, the bezel being biased to non-rotated and non-pivoted positions;

at least one first movement sensor configured to provide a first movement signal when movement of the bezel occurs, wherein the first movement signal is operable to scroll computer-generated information presented on the display screen in a vertical direction in response to the bezel being pivoted in a first direction and subsequently rotated and operable to scroll computer-generated information presented on the display screen in a horizontal direction in response to the bezel being pivoted in a second direction and subsequently rotated;

at least one second movement sensor configured to provide a second movement signal when movement of the bezel occurs in a planar direction substantially parallel to the display screen, wherein the second movement signal is operable to move a cursor displayed on the display screen in the planar direction; and a browser application presented on the display screen and operable to render web pages for viewing by a user of the small computing device, wherein movement of the bezel provides the user functionality to scroll through information presented in the web pages;

wherein the small computing device is a wristwatch.

17. A user interface as defined in claim 16 wherein the cursor is also responsive to said first movement signal.

18. A user interface as defined in claim 17, wherein the cursor is a pointing icon cursor.

* * * * *